W. H. LITTEL.
Corn Planter.

No. 105,702.  Patented July 26, 1870.

Witnesses:
John Becker
Geo. W. Mabee

Inventor:
Wm. H. Littel
Per Munn & Co.
Attorneys.

United States Patent Office.

WILLIAM H. LITTEL, OF PRAIRIE DU CHIEN, WISCONSIN.

Letters Patent No. 105,702, dated July 26, 1870.

IMPROVEMENT IN CORN-PLANTERS.

The Schedule referred to in these Letters Patent and making part of the same

*To all whom it may concern:*

Be it known that I, WILLIAM H. LITTEL, of Prairie du Chien, in the county of Crawford and State of Wisconsin, have invented a new and useful Improvement in Corn-Planters; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object to furnish a simple, convenient, and effective corn-planter, which shall be so constructed and arranged as to enable the corn to be readily planted in accurate check row, without its being necessary to previously mark out the ground either way; and It consists in the construction and combination of the various parts of the machine, as hereinafter more fully described.

A is the frame of the machine, which is made of such a width that the drive-wheels B, placed upon the journals of the axle C, may be at the distance apart at which it is desired to plant corn.

The axle C revolves in bearings attached to the rear parts of the side-bars of the frame A.

One of the wheels B revolves loosely upon the axle C, and the other wheel B is securely attached to the other journal of the axle C, so as to carry the said axle with it in its revolution.

The rims of the wheels B are made broad, so as to press the soil down upon the seed and cover it.

The forward ends of the side bars of the frame A are made broad, or to the outer sides of the forward ends of the said bars are attached beams or blocks, $a^1$, so that the furrowing-plows and dropping device may be directly in front of the wheels B.

D are the plows, which are attached to the lower ends of the standards E, which pass up through slots in the forward parts, $a^1$, of the side bars of the frame A, so as to be directly in front of the wheels B.

Figure 1:
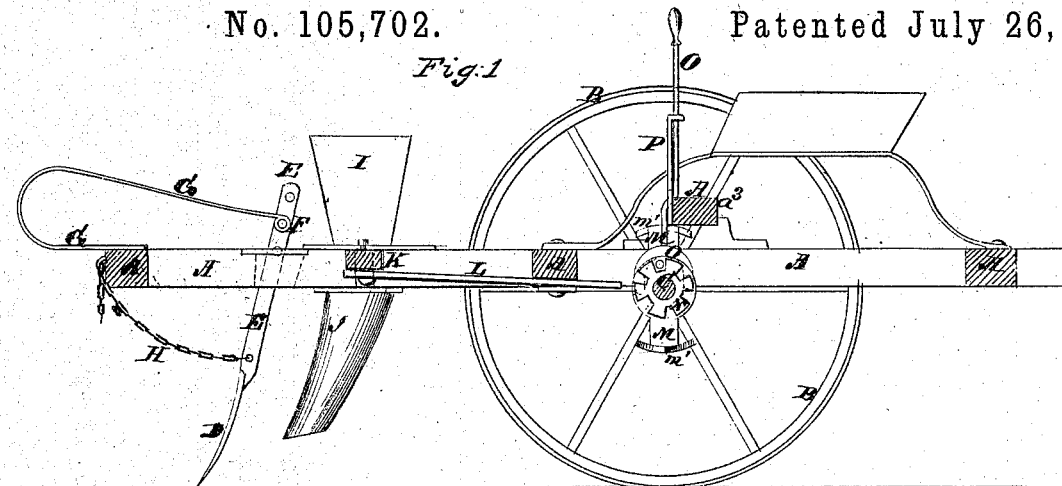
Figure 1 is a vertical longitudinal section of my improved machine, taken through the line $x\ x$, fig. 2.
Figure 2:
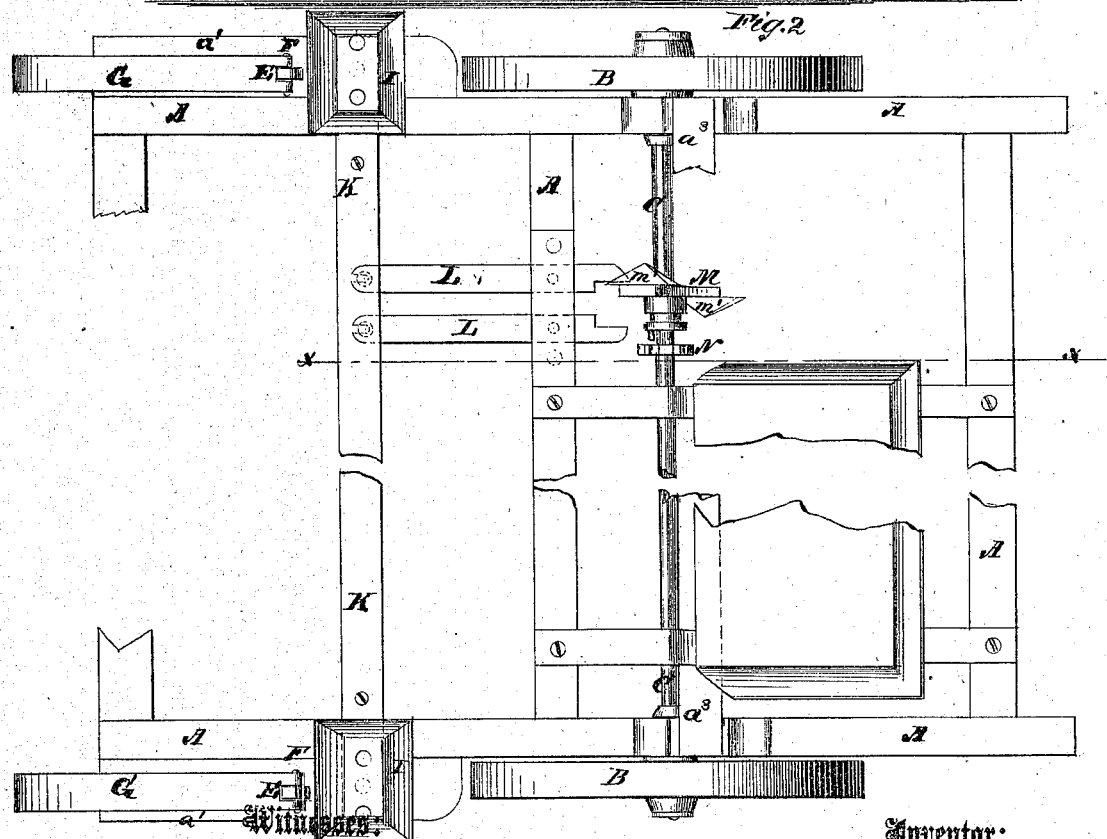
Figure 2 is a top view of the same, parts being broken away to show the construction.

Through the upper parts of the standards E is passed a pin, F, the ends of which, upon both sides of the standards E, are connected with the ends of the springs G, which ends are slotted or notched to receive the said standards, as shown in figs. 1 and 2.

The springs G are attached to the forward parts, $a^1$, of the side bars of the frame A, and are so arranged as to hold the plows down to their work under ordinary circumstances, but allow said plows to rise should they strike an obstruction.

Several holes are formed through the upper parts of the standards E for the reception of the pins F, so that the plows may be adjusted to work deeper or shallower in the ground, as may be desired.

The draft strain upon the standards E is sustained by the chains H, the lower ends of which are attached to the lower parts of the standards E, and the upper ends of which are adjustably attached to the forward ends of the side bars $a^1$ of the frame A, so that the said chains may be lengthened and shortened as may be desired.

I are the seed-hoppers, which are attached to the side bars $a^1$ of the frame A directly in the rear of the standards E, and directly in front of the wheels B.

Through the bottom of the hopper I are formed two holes for the seed to pass into the hole in the dropping-slide, and through each of the bars $a^1$ directly beneath the center of the hoppers, and about midway between the two holes in the bottom of said hoppers is formed a single hole, through which the seed passes from the dropping-slide into the spouts J, by which it is conducted to the ground in the rear of the plows D and in front of the wheels B, so that the soil may be pressed down over it by the said wheels.

K is the dropping-slide, which passes across the machine, and the ends of which pass through and work in recesses formed in the bars $a^1$ beneath the hoppers I.

In each of the end parts of the sliding bar K is formed a single hole, which, as the bar K is moved longitudinally, comes beneath the holes in the bottom of the hoppers alternately, so as to receive seed through said holes and transfer it to the holes in the bars $a^1$, through which it passes to the ground.

To the sliding bar K are pivoted the forward ends of two parallel bars, L, or of a single bar, having its rear end notched or slotted.

The bars or bar L are pivoted to the cross-bar $a^2$ of the frame A, and are held in a horizontal position by a keeper attached to the said bar $a^2$.

The rear ends or end of the bars or bar L project into such a position as to be struck by the inclines $m'$, attached to the opposite sides of the opposite ends of the bar M, which is attached to a hub placed upon and secured to the axle C, in such a way that the said bar may slide longitudinally upon the said axle.

The bar M is moved upon the axle C to throw it into and out of gear with the clutch N, attached to the said axle, so that the said bar may be carried around by and with the axle in its revolution, by the lever O, the lower end of which is forked and rides upon the hub of the said bar M.

The lever O is pivoted to the cross-bar $a^3$ of the frame A, or to some other suitable support, in such a position that it may be conveniently reached and operated by the driver from his seat. The lever O is held securely in either position by the notched catch-bar or plate F, attached to the frame of the machine.

Having thus described my invention,

I claim as new and desire to secure by Letters Patent—

1. The combination of the spring G, adjustable pin F, and adjustable chains H, with the plow-standard E and frame A $a^1$, substantially as herein shown and described, and for the purpose set forth.

2. The combination of the bars or bar L, bar M, having inclines $m'$ formed upon or attached to the opposite sides of its opposite ends, clutch N, and lever O, with each other and with the dropping-bar K, frame A, and axle C, substantially as herein shown and described and for the purpose set forth.

3. An improved corn-planter, formed by the combination of the wheels B, axle C, frame A $a^1$, plows D, plow-standards E, adjustable pins F, springs G, adjustable chains H, seed-hoppers I, conductor-spouts J, dropping-slide K, bars or bar L, arm M $m'$, clutch N, lever O, and catch-bar F with each other, substantially as herein shown and described, and for the purpose set forth.

WILLIAM H. LITTEL.

Witnesses:
O. B. THOMAS,
FRANK DUDLEY.